(12) United States Patent
Kim et al.

(10) Patent No.: US 10,055,629 B2
(45) Date of Patent: Aug. 21, 2018

(54) FINGERPRINT SENSOR AND TOUCH DEVICE INCLUDING THE SAME

(71) Applicant: LG INNOTEK CO., LTD., Seoul (KR)

(72) Inventors: Seung Jin Kim, Seoul (KR); Jae Wan Park, Seoul (KR); Hyun Soo Kim, Seoul (KR); Jung Hwan Bang, Seoul (KR); Dong Keun Lee, Seoul (KR); Sin Ae Jang, Seoul (KR); Jong Seon Jeong, Seoul (KR); Kyoung Jong Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 369 days.

(21) Appl. No.: 14/814,572

(22) Filed: Jul. 31, 2015

(65) Prior Publication Data

US 2016/0042217 A1 Feb. 11, 2016

(30) Foreign Application Priority Data

Aug. 5, 2014 (KR) .................. 10-2014-0100243
Nov. 6, 2014 (KR) .................. 10-2014-0153929

(51) Int. Cl.
*G06K 9/00* (2006.01)
*G06F 3/041* (2006.01)

(52) U.S. Cl.
CPC ........... *G06K 9/0002* (2013.01); *G06F 3/041* (2013.01); *G06K 9/00053* (2013.01)

(58) Field of Classification Search
CPC ... G06K 9/0002; G06K 9/00053; G06F 3/041
(Continued)

(56) References Cited

U.S. PATENT DOCUMENTS 6,289,114 B1* 9/2001 Mainguet ............. G06K 9/0002
382/124
2005/0105784 A1* 5/2005 Nam .................... G06K 9/0002
382/124

(Continued)

FOREIGN PATENT DOCUMENTS

CN 103412688 A 11/2013
EP 2738653 A2 6/2014

(Continued)

OTHER PUBLICATIONS

European search report for European Patent Application No. 15178869.2 corresponding to the above-referenced U.S. application.

*Primary Examiner* — Bryan Gordon
(74) *Attorney, Agent, or Firm* — LRK Patent Law Firm

(57) ABSTRACT

A fingerprint sensor includes a piezoelectric substrate, and an electrode on the piezoelectric substrate. The electrode includes a first electrode and a second electrode on at least one of one surface of the piezoelectric substrate and an opposite surface opposite to the one surface. The electrode includes a node area in which the first electrode crosses the second electrode, and the node area transmits and receives a signal by an object that makes contact with the node area or approaches the node area in a direction of the piezoelectric substrate. The fingerprint sensor includes a substrate including a first area to a fourth area. At least one of first and second electrodes is provided in the first area to the third area, and a chip connected with the first and second electrodes is provided in the fourth area.

16 Claims, 17 Drawing Sheets

(58) Field of Classification Search
USPC .................................... 310/323.21; 382/124
See application file for complete search history.

(56) References Cited

U.S. PATENT DOCUMENTS

| | | |
|---|---|---|
| 2008/0175450 A1 | 7/2008 | Scott |
| 2011/0227858 A1 | 9/2011 | An et al. |
| 2012/0134549 A1* | 5/2012 | Benkley, III ........... G01N 27/04 |
| | | 382/124 |
| 2013/0133428 A1 | 5/2013 | Lee et al. |
| 2014/0152917 A1 | 6/2014 | Lee et al. |
| 2014/0232950 A1* | 8/2014 | Park ........................ G06F 3/044 |
| | | 349/12 |
| 2015/0301672 A1* | 10/2015 | Kim ......................... G09G 3/20 |
| | | 345/156 |

FOREIGN PATENT DOCUMENTS

| | | |
|---|---|---|
| GB | 2478804 A | 9/2011 |
| KR | 10-2005-0047921 A | 5/2005 |
| KR | 10-2013-0060874 A | 6/2013 |
| WO | 01/10296 A2 | 2/2001 |

* cited by examiner

FINGERPRINT SENSOR AND TOUCH DEVICE INCLUDING THE SAME

BACKGROUND OF THE INVENTION

1. Field of the Invention

The embodiment relates to a fingerprint sensor and a touch device including the same.

2. Description of Related Art

A fingerprint sensor, which detects the fingerprint of a person, has been extensively used to determine the on/off of power and the release of a sleep mode in not only a door lock, which is conventionally widely used, but also an electronic device used recently.

Fingerprint sensors may be classified into an ultrasonic fingerprint sensor, an infrared fingerprint sensor, and a capacitive fingerprint sensor according to the operating principles thereof.

The fingerprint sensor may be manufactured by arranging electrodes and a fingerprint recognition driving chip on a substrate.

In the case of the fingerprint sensor, in order to detect the variation on a micro-cap, the distance between a sensing part and a chip must be short. However, as the sensing part becomes gradually away from the chip, the touch sensitivity of the fingerprint sensor may be degraded due to the noise resulting from the distance difference.

Further, in order to enhance the accuracy of the fingerprint sensing in the ultrasonic fingerprint sensor, the number of piezoelectric sensors must be increased. Especially, the number of piezoelectric sensors provided per unit area must be more increased in order to accurately recognize the fingerprint of a child and a woman having a significantly fine interval between ridges and valleys Accordingly, there is required a fingerprint sensor having a novel structure capable of solving the above problem and a touch device including the same.

SUMMARY

The embodiment provides a fingerprint sensor having an improved electrical characteristic and a thin thickness, and a touch device including the same.

According to the embodiment, there is provided a fingerprint sensor including a piezoelectric substrate, and an electrode on the piezoelectric substrate. The electrode includes a first electrode and a second electrode on at least one of one surface of the piezoelectric substrate and an opposite surface opposite to the one surface. The electrode includes a node area in which the first electrode crosses the second electrode, and the node area transmits and receives a signal by an object that makes contact with the node area or approaches the node area in a direction of the piezoelectric substrate.

In addition, according to the embodiment, there is provided a fingerprint sensor including a substrate including a first area to a fourth area. At least one of first and second electrodes is provided in the first area to the third area, and a chip connected with the first and second electrodes is provided in the fourth area.

As described above, the fingerprint sensor according to the first embodiment can have a reduced thickness. In detail, since an ultrasonic signal can be transmitted from and received to one node area according to the need, a transmission layer and a reception layer may not be separately formed. Accordingly, the thickness of the fingerprint sensor can be reduced.

In addition, according to the fingerprint sensor of the embodiment, the transparent PVDF can be employed for a piezoelectric substrate. Accordingly, the piezoelectric substrate cannot be identified to the outside with the naked eye. Accordingly, the PVDF can be employed even in a display area of a display device.

Further, according to the fingerprint sensor of the embodiment, the resolution of the node area serving as the sensor is formed to more than a predetermined value. Accordingly, the fingerprint can be accurately recognized through the node area, so that the reliability of the fingerprint sensor can be improved.

According to the fingerprint sensor of the embodiment, the electrode and the chip may be provided according to areas on the same surface of the substrate, and the substrate is folded, so that the electrode can be provided on one surface of the substrate, and the chip can be provided on the opposite surface of the substrate.

In other words, the substrate can be bent so that the area in which the first and second electrodes are provided is overlapped with an area in which a chip is provided.

Accordingly, the first electrode can be connected with the second electrode within the shortest distance.

In the case of the fingerprint sensor, in order to detect the variation on a micro-cap, the distance between a sensing part and a chip must be short. However, as the sensing part becomes gradually away from the chip, the touch sensitivity of the fingerprint sensor may be degraded due to the noise resulting from the distance difference.

Therefore, according to the fingerprint sensor of the second embodiment, the distance difference between the chip and the electrode, that is, the distance difference between the chip and the sensing parts can be reduced to the minimum value. Accordingly, the noise resulting from the distance difference between the chip and the sensing parts can be reduced, so that the touch characteristic and the reliability of the fingerprint sensor can be improved.

DETAILED DESCRIPTION OF THE EMBODIMENTS

Figure 1:
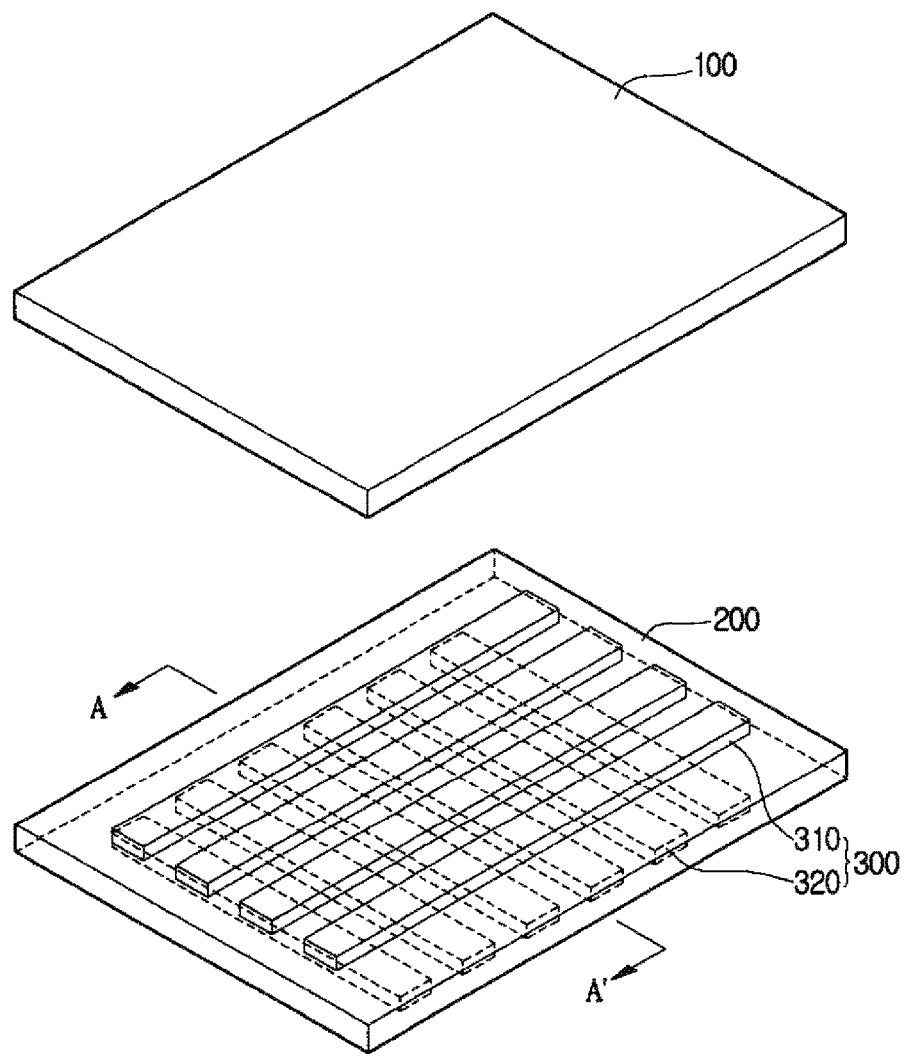
FIG. 1 is a perspective view showing a fingerprint sensor according to the first embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

It will be understood that when an element is referred to as being "connected" with another element, it can be directly connected with the other element or intervening elements may be present. In the following description, when a predetermined part "includes" a predetermined component, the predetermined part does not exclude other components, but may further include other components unless otherwise indicated.

The thickness and size of each layer (film), region, pattern, or structure shown in the drawings may be exaggerated, omitted or schematically drawn for the purpose of convenience or clarity. In addition, the size of the layer (film), region, pattern, or structure does not utterly reflect an actual size.

Hereinafter, a fingerprint sensor according to the first embodiment will be described with reference to FIGS. 1 to 4.

Referring to FIGS. 1 to 4, the fingerprint sensor according to the embodiment may include a cover substrate 100, a piezoelectric substrate 200, and an electrode 300.

The cover substrate 100 may be rigid or flexible. For example, the cover substrate 100 may include glass or plastic.

In detail, the substrate 100 may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the cover substrate 100 may include an optically isotropic film. For example, the substrate 100 may include cyclic olefin copolymer (COC), cyclic olefin polymer (COP), optically isotropic polycarbonate (PC), or optically isotropic polymethyl methacrylate (PMMA).

The sapphire, has superior electric characteristics, such as permittivity, so that a touch response speed may be greatly increased and a space touch such as hovering may be easily implemented. In addition, since the sapphire has high surface hardness, the sapphire is applicable to a cover substrate. The hovering refers to a technique of recognizing coordinates even at a slight distance from a display.

In addition, the cover substrate 100 may be partially bent to have a bent surface. That is, the cover substrate 100 may have a partial flat surface and a partial curved surface. In detail, an, end of the substrate 100 may be bent to have a bent surface or may be bent or flexed to have a surface including a random curvature.

In addition, the cover substrate 100 may include a flexible substrate.

Further, the cover substrate 100 may include a curved or bended substrate. That is to say, even the fingerprint sensor including the substrate may be formed to have a flexible, curved or bended property. Accordingly, the fingerprint sensor according to the embodiment may be variously designed.

A decoration layer may be provided in predetermined color on the cover substrate 100. For example, a decoration layer may be further provided at one area of the cover substrate to match the color of peripheral components or the package of the fingerprint sensor provided at one area of the cover substrate 100 with the color of the cover substrate 100.

The piezoelectric substrate 200 may be provided on the cover substrate 100. The piezoelectric substrate 200 may be a piezoelectric film. For example, the piezoelectric substrate 200 may include a transparent film, a semi-transparent film, or an opaque piezoelectric film.

The piezoelectric substrate 200 may include various piezoelectric materials. For example, the piezoelectric substrate 200 may include single crystal ceramics, polycrystalline ceramics, a polymer material, a thin film material, and a composite material of a polycrystalline material and a polymer material.

The piezoelectric material of the single crystal ceramics may include α-AlPO$_4$, α-SiO$_2$, LiTiO$_3$, LiNbO$_3$, SrxBayNb$_2$O$_3$, Pb$_5$—Ge$_3$O$_{11}$, Tb2(MnO4)3, Li$_2$B$_4$O$_7$, CdS, ZnO, or Bi1$_2$SiO$_2$O or Bi1$_2$GeO$_{20}$.

The piezoelectric material of the polycrystalline ceramics may include a PZT-based material, a PT-based material, a PZT-complex perovskite-based material, or BaTiO$_3$.

In addition, the piezoelectric material of the polymer material may include PVDF, P(VDF-TrFe), P(VDFTeFE), or TGS.

In addition, the piezoelectric material of the thin film material may include ZnO, CdS, or AlN.

Further, the piezoelectric material of the composition material may include PZT-PVDF, PZT-Silicon Rubber, PZT-Epoxy, PZT-foamed polymer, or PZT-foamed urethane.

The piezoelectric substrate 200 may include the piezoelectric material of the composition material. For example, the piezoelectric substrate 200 according to the embodiment may include at least one of PVDF, P(VDF-TrFe), and P(VDFTeFE).

The piezoelectric substrate 200 may include an active area AA and an unactive area UA defined therein.

The active area AA may be an area in which a fingerprint is recognized, and the unactive area UA provided at the peripheral portion of the active area AA is an area in which the fingerprint is not recognized.

In detail, if a finger approaches the active area AA or makes contact with the active area AA, a fingerprint can be recognized by a transmitted or received ultrasonic wave in the active area. The principle of operating the fingerprint sensor will be described in detail below.

The electrode 300 may be provided on the piezoelectric substrate 200. For example, the electrode 300 may be provided on at least one of one surface of the piezoelectric substrate 200 and an opposite surface of the piezoelectric substrate 200.

Figure 2:
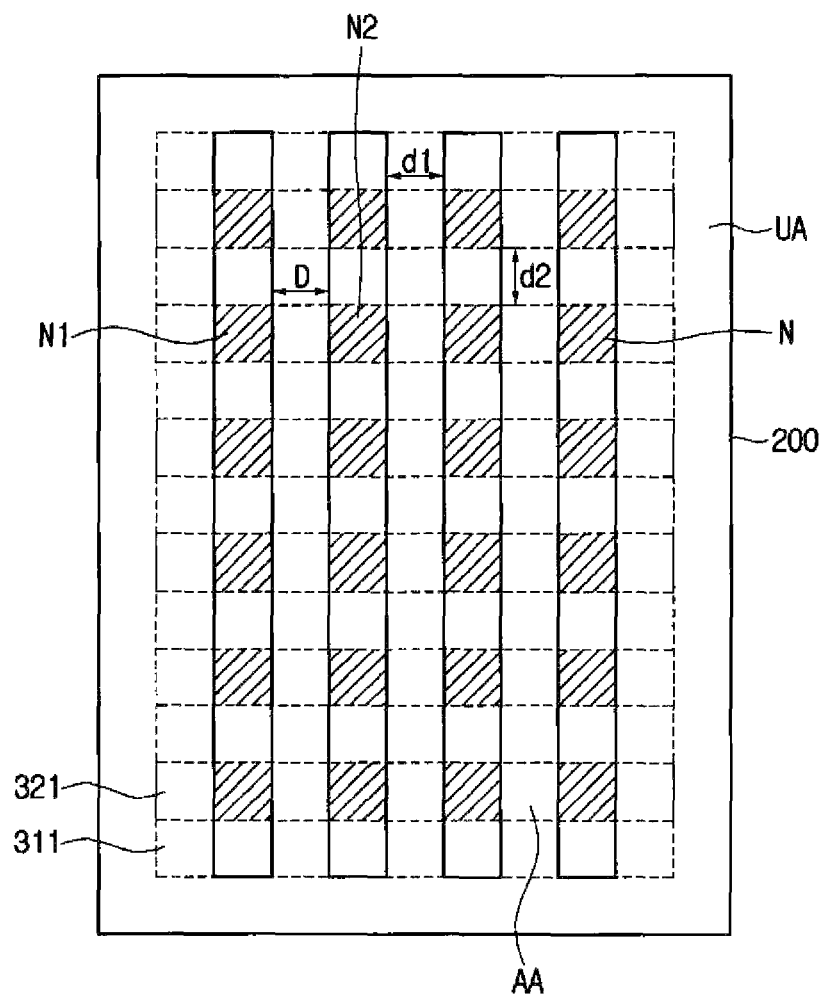
FIG. 2 is a plan view showing the fingerprint sensor according to the first embodiment.
Figure 3:
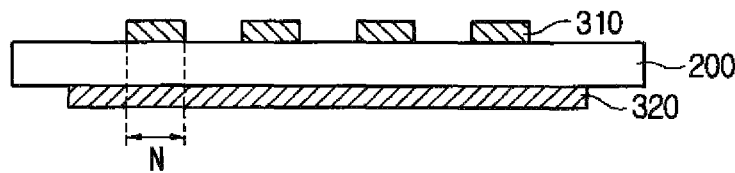
FIG. 3 is a sectional view taken along line A-A' of FIG. 1.

Referring to FIGS. 1 to 3, the electrode 300 may include a first electrode 310 and a second electrode 320. In addition, the first electrode 310 may be provided on one surface of the piezoelectric substrate 200, and the second electrode 320 may be provided an opposite surface of the piezoelectric substrate 200.

At least one of the first and second electrodes 310 and 320 may include a conductive material.

At least one of the first and second electrodes 310 and 320 may include a transparent conductive material that allows electricity to flow therethrough without interrupting transmission of light. For example, at least one of the first and second electrodes 310 and 320 may include metal oxide such as indium tin oxide (ITO), indium zinc oxide (IZO), copper oxide, tin oxide, zinc oxide, or titanium oxide. Since the transparent material is disposed on the active area, a degree of freedom may be improved when the pattern of the electrode is formed.

In addition, at least one of the first and second electrodes 310 and 320 may include a nanowire, a photo-sensitive nanowire film, a carbon nanotube (CNT), graphene, conductive polymer or a mixture thereof. Thus, when a flexible or bendable fingerprint sensor is manufactured, the degree of freedom may be improved.

When a nano-composite such as a nanowire or a carbon nanotube (CNT) is used, the electrode may be realized in black color, and the color and the control of the reflectance are possible while the electrical conductivity is ensured by controlling in the content of nanopowders.

At least one of the first and second electrodes 310 and 320 may include various metals. For example, at least one of the first and second electrodes 310 and 320 may include at least one of Cr, Ni, Cu, Al, Ag, Mo, Au, Ti and the alloy thereof. Accordingly, when a flexible or bendable fingerprint sensor is manufactured, the degree of freedom may be improved.

At least one of the first and second electrodes 310 and 320 may be formed in a mesh shape. In detail, at least one of the first and second electrodes 310 and 320 may have a mesh shape by sub-electrodes crossing each other.

The mesh line width of the first and second electrodes may be in the range of about 0.1 μm to about 10 μm. The mesh line part having the mesh line width of about 0.1 μm or less is impossible due to the characteristic of the fabrication process, and may be shorted. In addition, if the mesh line part has the mesh line width exceeding about 10 μm, the electrode pattern may be viewed from the outside, so that the visibility may be degraded. Preferably, the mesh line width may be in the range of about 0.5 μm to about 7 μm. More preferably, the mesh line width may be in the range of 1 μm to about 3.5 μm.

In addition, the mesh lines of the first and second electrodes may be in the range of about 100 nm to about 500 nm. If the thickness of the mesh line is about 100 nm or less, the resistance of the electrode may be increased, so that the electrical characteristic may be degraded. If the thickness of the mesh line exceeds about 500 nm, the whole thickness of the fingerprint sensor may be increased, so that the process efficiency can be degraded. Preferably, the thickness of the mesh line may be in the range of about 150 nm to about 200 nm. More preferably, the thickness of the mesh line may be in the range of about 180 nm to about 200 nm.

The first and second electrodes 310 and 320 may be provided in the mesh shape through various schemes.

For example, a metal layer including an electrode material, such as copper (Cu), constituting the first and second electrodes 310 and 320 is provided on one surface of the piezoelectric substrate, and etched in the mesh shape, so that the first and second electrodes may be formed in the mesh shape.

In addition, a base substrate, for example, a resin layer is provided on one surface of the piezoelectric substrate 200, and an intaglio pattern or an embossment pattern is formed in the resin layer using an intaglio mold or an embossment mold. Thereafter, the intaglio or embossment pattern may be filled with metallic paste including at least one metal of Cr, Ni, Cu, Al, Ag, Mo, and the alloy thereof and cured to form the first and second electrodes having an intaglio mesh shape or an embossment mesh shape.

The first and second electrodes 310 and 320 may be connected with a wire electrode 400 provided in the unactive area UA. The wire electrode 400 may be connected with a printed circuit board (not shown in drawings) provided in the unactive area UA.

The first and second electrodes 310 and 320 may cross each other. In detail, the first electrode 310 may include at least one first electrode pattern 311 extending in one direction, and the second electrode 320 may include at least second electrode pattern 321 extending in a direction different from the one direction.

Although FIG. 2 shows that the first electrode pattern 311 and the second electrode pattern 321 are formed in a bar pattern, the embodiment is not limited thereto. The first and second electrode patterns 311 and 321 may have various shapes such as a polygonal shape including a rectangular shape, a diamond shape, a pentagonal shape, or a hexagonal shape, or a circular shape.

Accordingly, the first electrode 310 and the second electrode 320 may include a node area N in which the first and second electrode patterns 311 and 321 extending in mutually different directions cross each other.

In the node area N, a signal may be transmitted or received by an object approaching or making contact with the piezoelectric substrate 200. In detail, an ultrasonic signal can be transmitted from and received to the node area N. In other words, the node area N may include a sensor to recognize a fingerprint according to the approach or the contact of the finger.

At least one node area N may be provided on the piezoelectric substrate 200. In detail, a plurality of node areas N may be provided on the piezoelectric substrate 200. For example, the node area N may have the resolution of about 400 dpi to about 500 dpi with respect to the piezoelectric substrate 200.

Accordingly, the interval between the node areas N may be about 100 μm or less. For example, the node area N may include first and second node areas N1 and N2 adjacent to each other. The first node area N1 may be spaced apart from the second node area N2 by an interval of about 100 μm or less.

For example, at least one of a first interval between the first electrode patterns 311 and a second interval between the second electrode patterns 321, which constitute the node areas N, may be about 100 μm or less, in detail, about 70 μm or less, in more detail, about 50 μm or less.

If the interval between the node areas N exceeds about 50 μm, the resolution of the node areas N may be degraded. Accordingly, the ultrasonic signal transmitted from and received to the node areas N is weakened, so that the fingerprint cannot be accurately recognized. Accordingly, the reliability of the fingerprint sensor may be degraded.

The node area N can simultaneously transmit and receive the ultrasonic signal. In detail, when the finger approaches or makes contact with the node area N, the ultrasonic signal can be transmitted in a finger direction in the node area N, and the ultrasonic signal reflected by the finger may be received to the node area N. The fingerprint sensor according to the embodiment can recognize the fingerprint due to the difference between the transmitted and received signals.

Figure 4:
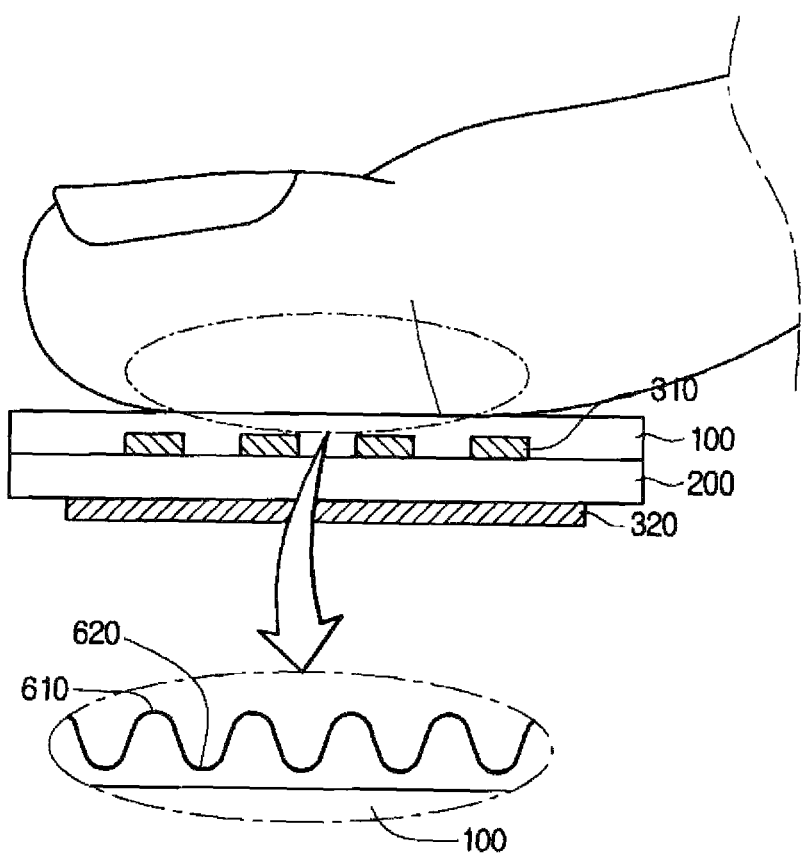
FIG. 4 is a sectional view to explain the operating principle of the fingerprint sensor.

FIG. 4 is a view to explain the operation of the fingerprint sensor as the finger makes contact with or approaches.

Referring to FIG. 4, as the voltage having a resonance frequency in an ultrasonic wave band is applied to the first and second electrodes 310 and 320 provided on one surface and an opposite surface of the piezoelectric substrate 200 from an external control unit, an ultrasonic signal can be generated from the piezoelectric substrate 200.

Regarding the ultrasonic signal, when the finger does not make contact with or approach the node area, most parts of the ultrasonic signal transmitted from the node area N of the piezoelectric substrate 200 return into the piezoelectric substrate 200 without passing through the interface between the piezoelectric substrate 200 and the air due to the difference in acoustic impedance between the air and the node area N of the piezoelectric substrate 200 to transmit the ultrasonic signal.

Meanwhile, as shown in FIG. 4, when the finger approaches or makes contact with the node area N, a portion of the ultrasonic signal transmitted from the node area N of the piezoelectric substrate 200 propagates into the finger through the interface between the skin of the finger and the piezoelectric substrate 200. Accordingly, the intensity of the signal reflected and returning is lowered, so that the fingerprint pattern can be detected.

Although it is difficult to recognize the pattern of the fingerprint with a naked eye of a user, the fingerprint may have a pattern that numerous ridges and valleys are repeated. As the valleys and the ridges are repeated, the variation in the height between the valley and the ridge may occur. Accordingly, as shown in FIG. 4, the piezoelectric substrate 200 does not directly make contact with the skin in a valley 610 of the fingerprint, but may directly make contact with the skin in a ridge 620 of the fingerprint.

Accordingly, the ultrasonic signal transmitted from the node area N of the piezoelectric substrate 200 corresponding to the valley 610 of the fingerprint extremely slight is transmitted to the outside, and most parts of the ultrasonic signal are reflected toward the inside and received to the node area N. A great amount of an ultrasonic signal 445 transmitted from the node area N of the piezoelectric substrate 200 corresponding to the ridge 620 of the fingerprint is propagated through the boundary surface of the finger and reflected, so that the intensity of the ultrasonic signal received to the node area N is significantly reduced.

Accordingly, the fingerprint pattern can be detected by measuring the intensity or the reflection coefficient of the ultrasonic signal, which is reflected and received due to the difference in acoustic impedance, according to the valley 610 and the ridge 620 of the fingerprint in each node area N.

The fingerprint sensor according to the first embodiment may have a reduced thickness. In detail, since an ultrasonic signal can be transmitted from and received to one node area N according to the need, a transmission layer and a reception layer may not be separately formed. Accordingly, the thickness of the fingerprint sensor can be reduced.

In addition, according to the fingerprint sensor of the first embodiment, the transparent PVDF can be employed for a piezoelectric substrate 200. Accordingly, the piezoelectric substrate cannot be identified to the outside with the naked eye. Accordingly, the PVDF can be employed even in a display area of a display device.

According to the fingerprint sensor of the first embodiment, the resolution of the node area N serving as the sensor is formed to more than a predetermined value. Accordingly, the fingerprint can be accurately recognized through the node area, so that the reliability of the fingerprint sensor can be improved.

Hereinafter, another example of the fingerprint sensor according to the first embodiment will be described with reference to FIGS. 5 to 13. In the following description of another example, the description the same as or similar to that of the previous embodiments will be omitted, and the same reference numerals will be assigned to the same elements.

Figure 5:
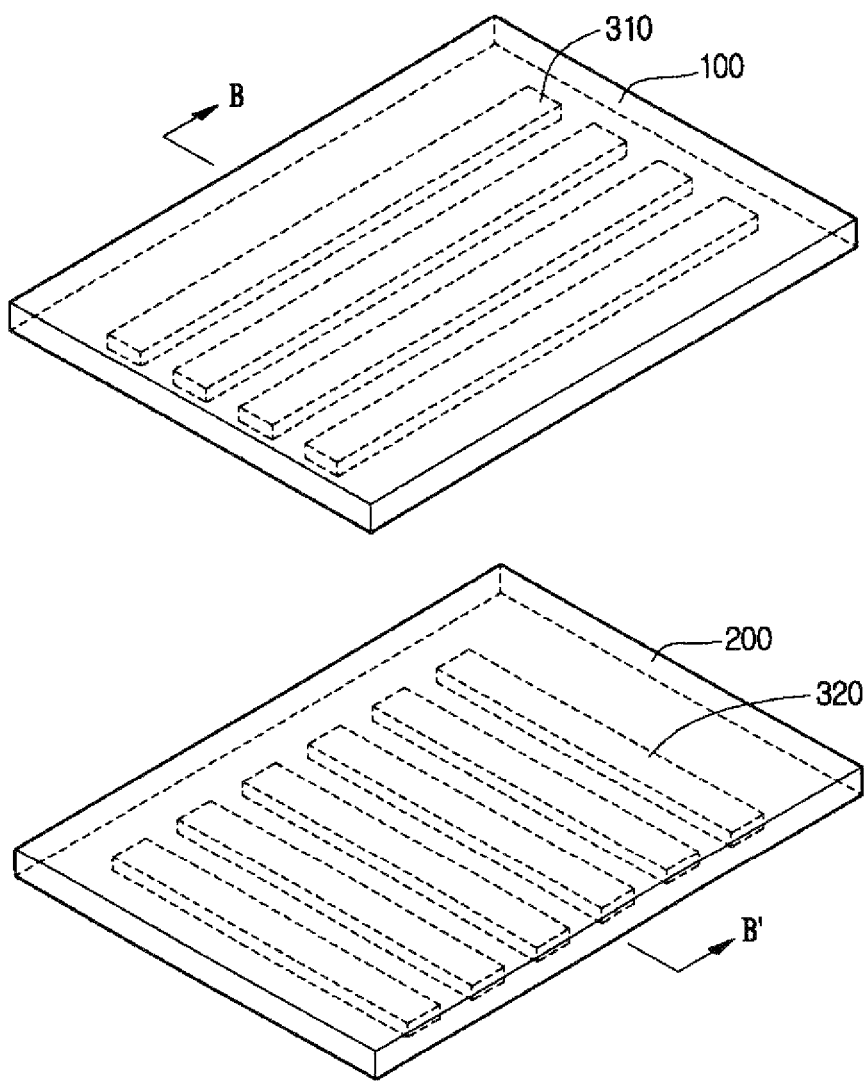
FIG. 5 is a perspective view showing a fingerprint sensor according to the second embodiment.
Figure 6:
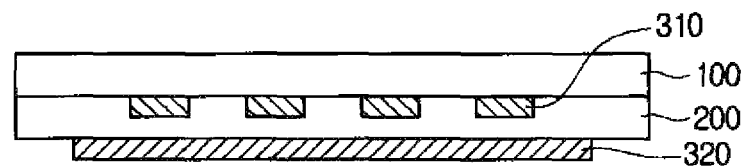
FIG. 6 is a sectional view taken along line B-B' of FIG. 5.

Referring to FIGS. 5 and 6, according to the fingerprint sensor according to another example of the first embodiment, the first and second electrodes may be provided at different positions.

For example, the first electrode 310 may be provided on one surface of the cover substrate 100. In addition, the second electrode 320 may be provided on one surface of the piezoelectric substrate 200. In detail, the first and second electrodes 310 and 320 may be provided on and under the piezoelectric substrate 200.

Similarly to the above-described first embodiment, the first and second electrodes 310 and 320 may include the first and second electrode patterns 311 and 321 extending in mutually different directions. The node area N may be formed in an area in which the first electrode pattern 311 crosses the second electrode pattern 321. In addition, the ultrasonic signal can be transmitted from or received to the node area N.

Figure 7:
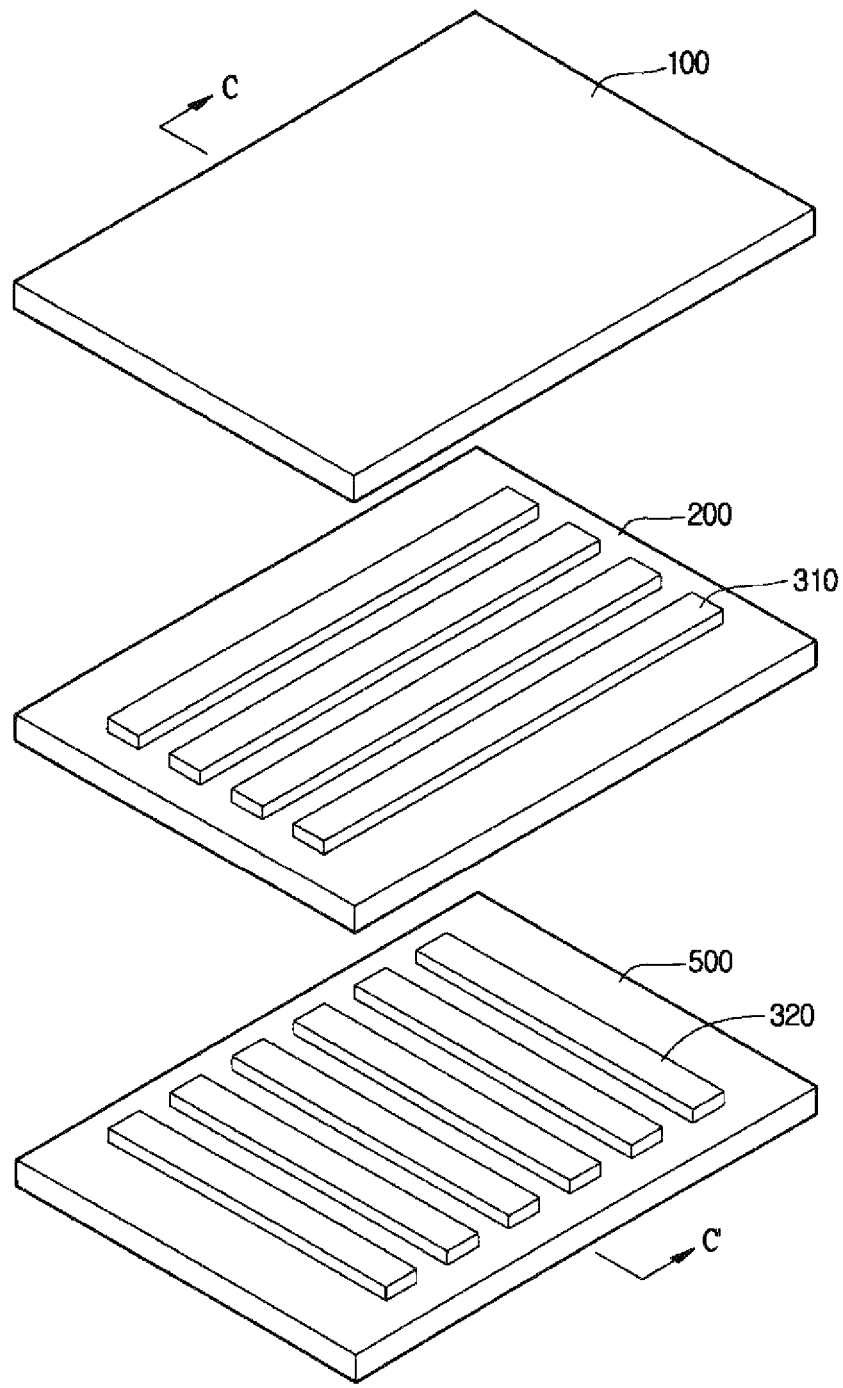
FIG. 7 is a perspective view showing a fingerprint sensor according to the third embodiment.
Figure 8:
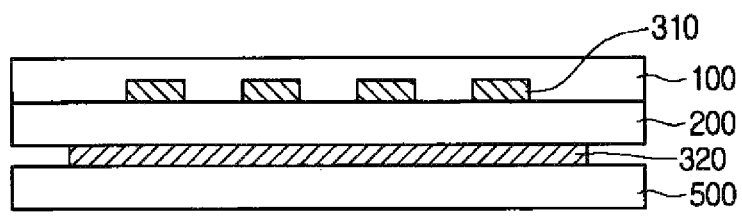
FIG. 8 is a sectional view taken along line C-C' of FIG. 7.
Figure 9:
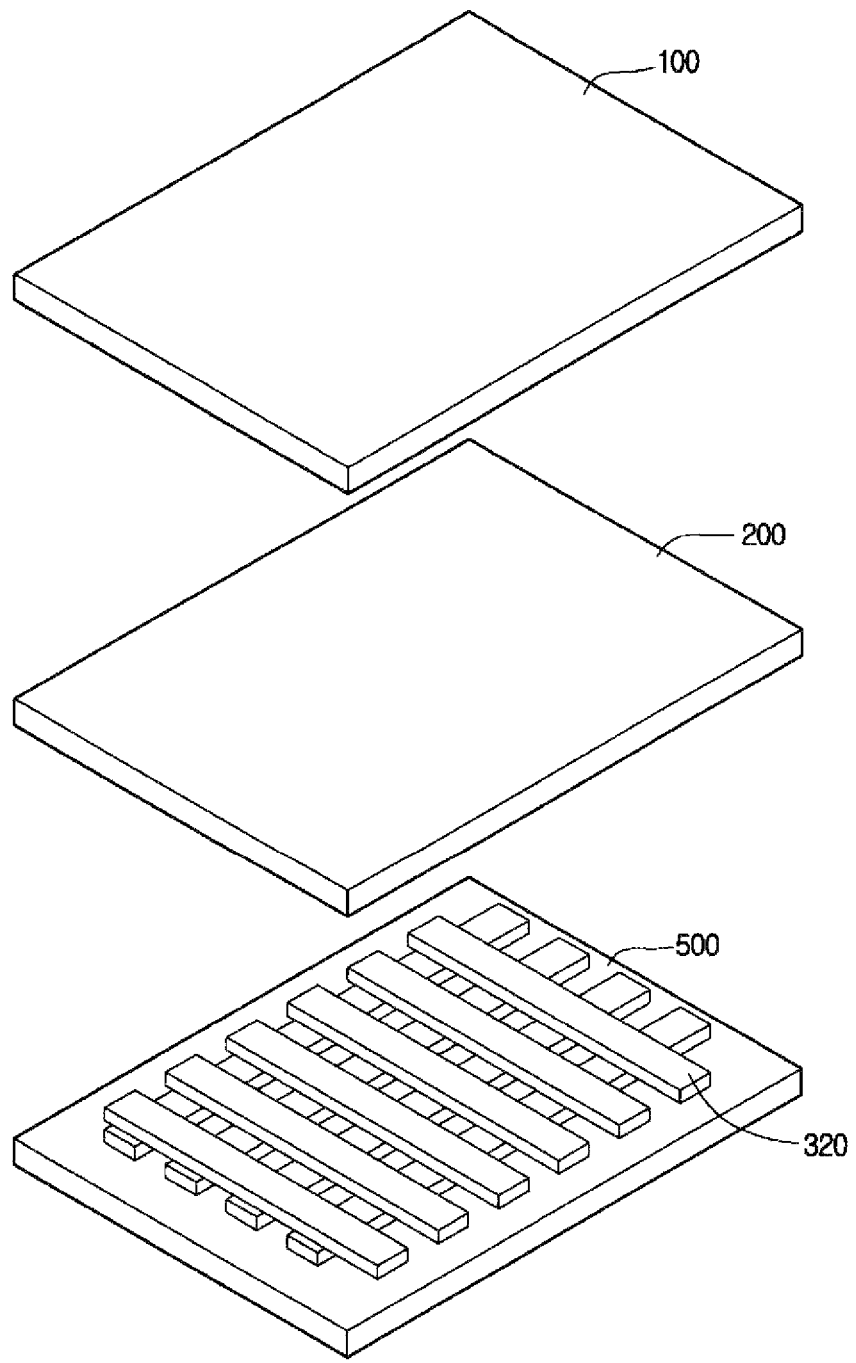
FIG. 9 is a perspective view showing a fingerprint sensor according to the fourth embodiment.

Referring to FIGS. 7 and 8, the fingerprint sensor according to another example of the first embodiment may further include a substrate 500.

In detail, the substrate 500 may be provided on the piezoelectric substrate 200.

The substrate 500 may include plastic. For example, the substrate 500 may include a material the same as or similar to that of the cover substrate 100.

In the fingerprint sensor of another example, the first electrode and the second electrode may be provided at mutually different positions.

For example, the first electrode 310 may be provided on the piezoelectric substrate 200 and the second electrode 320 may be provided on the substrate 500. In detail, the first and second electrodes 310 and 320 may be provided on and under the piezoelectric substrate 200.

Similarly to the first embodiment described above, the first and second electrodes 310 and 320 may include at least one of the first electrode pattern 311 and the second electrode pattern 321 extending in mutually different direction. The node area N may be formed in an area in which the first and second electrode patterns 311 and 321 cross each other. The ultrasonic signal can be transmitted from or received to the node area N.

Referring to FIGS. 9 to 13, the fingerprint sensor according to another example of the first embodiment may further include the substrate 500.

In detail, the substrate 500 may be provided on the piezoelectric substrate 200.

The substrate 500 may include plastic. For example, the substrate 500 may include a material the same as or similar to that of the cover substrate 100 described above.

In the fingerprint sensor of another example, the first electrode and the second electrode may be provided at the same position.

For example, the first and second electrodes 310 and 320 may be provided on the same surface of the substrate 500. In this case, first electrodes 310 may be connected with each other, and second electrodes 320 may be disconnected from each other.

Figure 10:
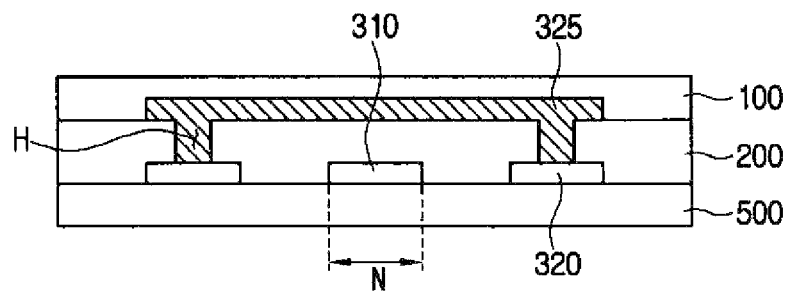
FIGS. 10 to 13 are sectional views showing various examples of the fingerprint sensor according to the fourth embodiment.

Referring to FIG. 10, the piezoelectric substrate 200 may be provided on the substrate 500. In detail, the piezoelectric substrate 200 may cover the first and second electrodes 310 and 320 provided on the substrate 500.

The piezoelectric substrate 200 may be formed therein with a hole H. In detail, the piezoelectric substrate 200 may be formed therein with the hole H to expose one surface of the second electrode 320.

A connection electrode 325 may be provided on the piezoelectric substrate 200. In detail, the connection electrode 325 may connect the second electrodes 320 with each other through the hole H.

In this case, the first electrode 310 and the connection electrode 325 may be provided at positions overlapped with each other. In other words, the first electrode 310 and the second electrode 320 may be provided on and under the piezoelectric substrate 200 by the connection electrode 325. The node area N may be formed at the position at which the first electrode 310 is overlapped with the connection electrode 325.

Figure 11:
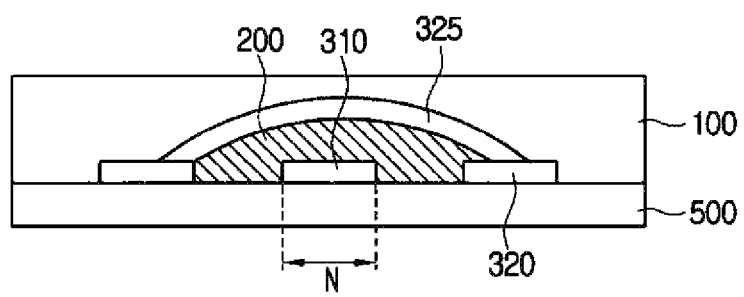

Referring to FIG. 11, the piezoelectric substrate 200 may be provided on the substrate 500. In detail, the piezoelectric substrate 200 may be provided on a portion of the substrate 500. For example, the piezoelectric substrate 200 may cover the first electrode 310.

The connection electrode 325 may be provided on the piezoelectric substrate 200. In detail, the connection electrode 325 may be provided on the piezoelectric substrate 200 to connect the second electrodes 320, which are adjacent to the first electrode 310 and provided on the same surface of the substrate 500, with each other.

In this case, the first electrode 310 may be overlapped with the connection electrode 325. In other words, the first and second electrodes 310 and 320 may be provided on and under the piezoelectric substrate 200 by the connection electrode 325. The node area N to transmit the ultrasonic signal may be formed at the position at which the first electrode 310 and the connection electrode 325 are overlapped with each other. In other words, the piezoelectric substrate 200 may be overlapped with the node area N on the substrate 500.

Although FIGS. 10 and 11 show that the piezoelectric substrate is provided on the first and second electrodes, the embodiment is not limited thereto. In other words, the first and second electrodes may be provided on the piezoelectric substrate.

Figure 12:
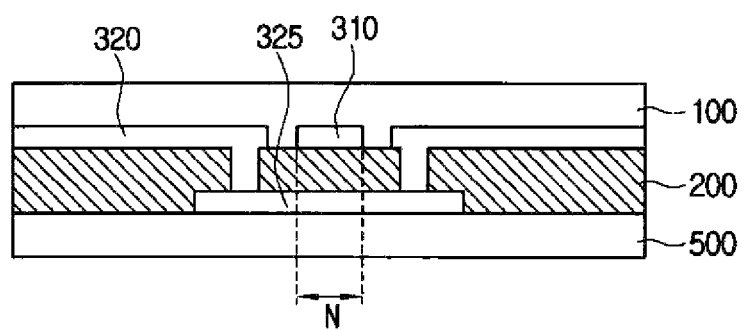

Referring to FIG. 12, the connection electrode 325 is provided on the substrate 500. The piezoelectric substrate 200 may be provided to surround the connection electrode 325. The piezoelectric substrate 200 may be formed therein with holes to expose one surface of the connection electrode 325.

The first and second electrodes 310 and 320 may be provided on the piezoelectric substrate 200. For example, the first electrode 310 may be provided on the piezoelectric substrate 200, and the second electrode 320 may be provided on the piezoelectric substrate 200 having the hole therein. The second electrode 320 may be connected with the connection electrode 325 through the hole so that the second electrodes 320 may be connected with each other.

In this case, the first electrode 310 may be overlapped with the connection electrode 325. In other words, the first electrode 310 and the second electrode 320 may be provided on and under the piezoelectric substrate 200 by the connection electrode 325, and the node area N, which transmits the ultrasonic signal, may be formed at a position at which the first electrode 310 is overlapped with the connection electrode 325.

Figure 13:
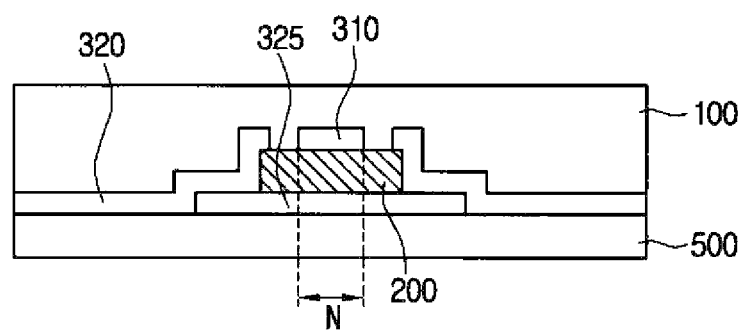

Referring to FIG. 13, the connection electrode 325 may be provided on the substrate 500, and the piezoelectric substrate 200 may be provided on the connection electrode 325.

The piezoelectric substrate 200 may be provided on one area of the connection electrode 325. In other words, the piezoelectric substrate 200 may be partially provided on the connection electrode 325.

The first and second electrodes 310 and 320 may be provided on the piezoelectric substrate 200. For example, the first electrode 310 may be provided on the piezoelectric substrate 200, and the second electrode 320 may be provided on the piezoelectric substrate 200 while making contact with the connection electrode 325. Accordingly, the second electrodes 320 spaced apart from each other may be connected with each other by the connection electrode 325.

In this case, the first electrode 310 may be overlapped with the connection electrode 325. In other words, the first and second electrodes 310 and 320 may be provided on and under the piezoelectric substrate 200, respectively, by the connection electrode 325, and the node area N, which transmits the ultrasonic signal, may be formed at a position at which the first electrode 310 is overlapped with the connection electrode 325. In other words, the piezoelectric substrate 200 is provided on the connection electrode 325 and may be provided at a position overlapped with the node area N.

Although FIGS. 9 to 14 show that the cover substrate 100 is provided, the cover substrate 100 may be omitted, and the substrate 500 may serve as the cover substrate. In other words, the piezoelectric substrate or the electrodes may be provided on the substrate.

Hereinafter, a fingerprint sensor according to the second embodiment will be described with reference to FIGS. 14 to 21. In the following description of the fingerprint sensor according to the second embodiment, the description the same as or similar to that of the previous first embodiment will be omitted, and the same reference numerals will be assigned to the same elements.

Figure 14:
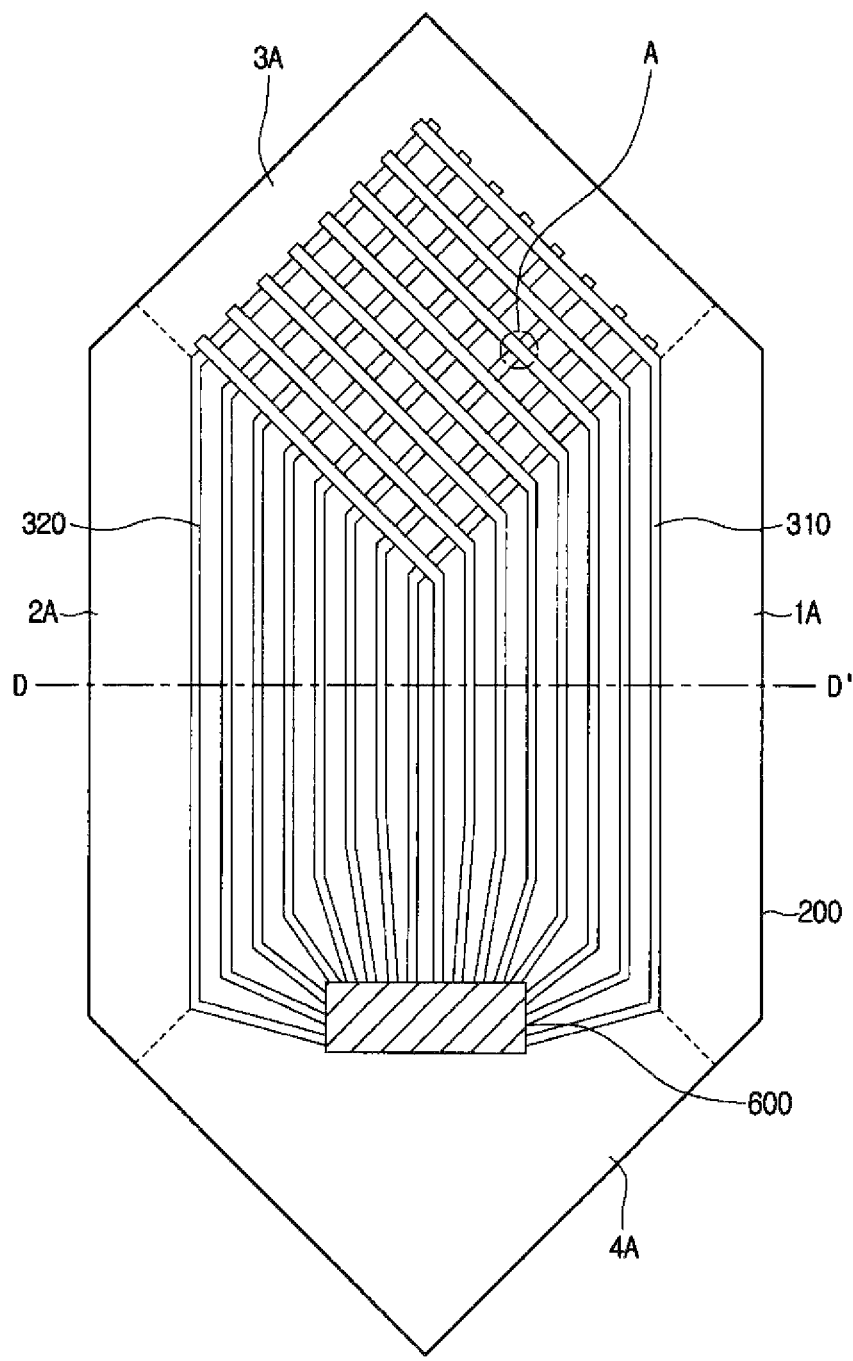
FIG. 14 is a plan view showing the fingerprint sensor according to the second embodiment.

Referring to FIG. 14, the fingerprint sensor according to the second embodiment may include a substrate, and an electrode and a chip provided on the substrate.

The substrate 200 may include a material the same as or similar to that of the substrate according to the first embodiment.

Referring to FIG. 14, the substrate 200 may have a substantially diamond shape. However, the embodiment is not limited thereto. In other words, the substrate 200 may have a polygonal shape such as a rectangular shape, or a circular shape having a curved surface.

The substrate 200 may include at least two areas. For example, the substrate 200 may include an area in which the electrode 300 is provided and an area in which a chip 600 is provided. In detail, the substrate 200 may include a first area 1A, a second area 2A, and a third area 3A, in which the electrode 300 is provided, and a fourth area 4A in which the chip 300 is provided.

The first to fourth areas 1A to 4A may be integrally formed with each other. In other words, the first to fourth areas 1A to 4A may be integrally formed with each other while being connected with each other.

The electrode 300 may be provided on the substrate 200. For example, the electrode 300 may be provided on the first to third areas 1A, 2A, and 3A of the substrate 200.

The electrode 300 may include the first electrode 310 and the second electrode 320.

The first electrode 310 and the second electrode 320 may include a conductive material.

The first electrode 310 and the second electrode 320 may include a material the same as or similar to that of the electrode according to the first embodiment.

In addition, the first electrode 310 and the second electrode 320 may be formed in a mesh shape similar to that of the electrode according, to the first embodiment.

At least one of the first electrode 310 and the second electrode 320 may be provided on at least one of the first area 1A, the second area 2A, and the third area 3A.

For example, the first electrode 310 may be provided on the first area 1A. In addition, the second electrode 320 may be provided in the second area 2A. In addition, the first electrode 310 and the second electrode 320 may be provided in the third area 3A.

The first electrode 310 may extend from the first area 1A to the third area 3A. In addition, the second electrode 320 may extend from the second area 2A to the third area 3A.

Accordingly, both of the first electrode 310 and the second electrode 320 may be provided in the third area 3A, and the first electrode 310 may be overlapped with the second electrode 320 in the third area 3A.

In addition, the first electrode 310 and the second electrode 320 may extend in mutually different directions in the third area 3A.

Figure 15:
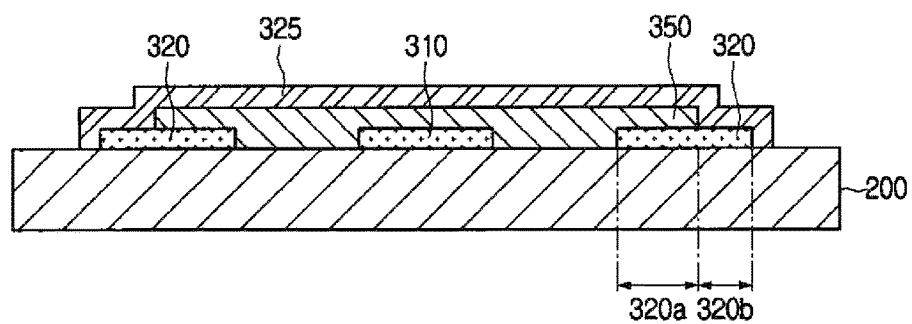
FIGS. 15 to 19 are sectional views showing various examples of an area A of FIG. 14.
Figure 16:
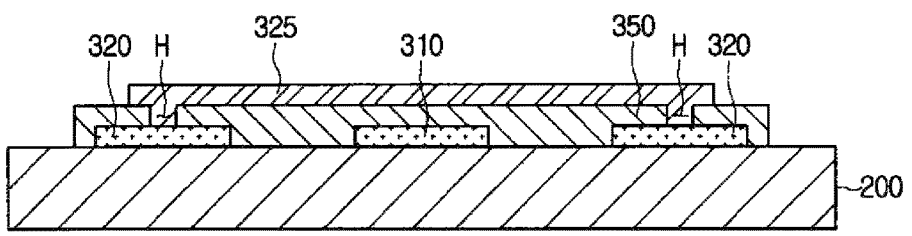
Figure 17:
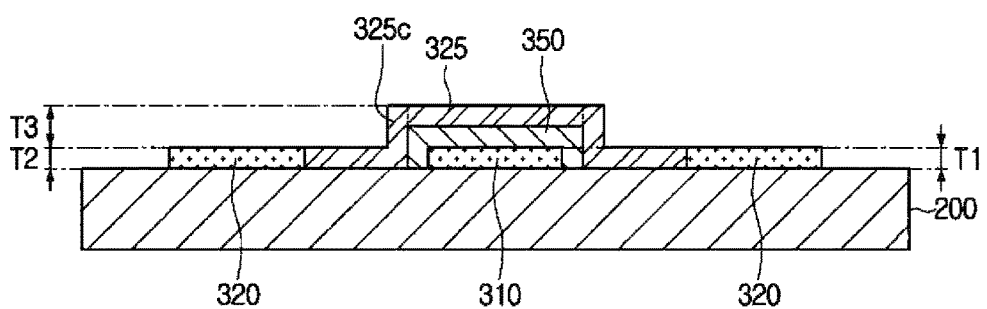

Referring to FIGS. 15 to 17, the first electrode 310 and the second electrode 320 may make contact with the substrate 200 in the third area 3A. For example, the first electrode 310 and the second electrode 320 may make contact with the substrate 100 on the same surface of the third area 3A of the substrate 200.

In detail, the first electrode 310 may be spaced apart from the second electrode 320 on the third area 3A of the substrate 200. The first electrode 310 may extend in a first direction, and the second electrode 320 may be divided into unit electrodes and arranged.

The insulating layer 350 may be provided on the first electrode 310 and the second electrode 320. Referring to FIG. 15, the insulating layer 350 may surround the first electrode 310 while making contact with a portion of the second electrode 320. Accordingly, the second electrode 320 may include a contact area 320a making contact with the insulating layer 350 and anon-contact area 320b to expose the second electrode 320 without the contact with the insulating layer 350.

The connection electrode 325 may be provided on the insulating layer 350. The connection electrode 325 may make contact with the second electrode 320. For example, the connection electrode 325 may make contact with the second electrode 320, and the unit electrodes of the second electrode 320 divided into each other may be connected with each other 320 through the non-contact area 320b.

The connection electrode 325 may connect second electrodes 320 with each other in a direction different from that of the first electrode 310. In detail, the second electrode 320 may extend in a direction different from that of the first electrode 310 through the connection electrode 325.

Accordingly, the first electrode 310 and the second electrode 320 may be provided on the same surface of the substrate 200 without the contact with each other on the substrate 200.

The connection electrode 325 may include a conductive material. The connection electrode 325 may include a material similar to or the same as that of at least one of the first electrode 310 and the second electrode 320.

Referring to FIG. 16, the insulating layer 350 may be provided on the first electrode 310 and the second electrode 320 while surrounding the first electrode 310 and the second electrode 320. The insulating layer 350 may be formed therein with a hole H to partially expose the second electrode 320.

The connection electrode 325 may be provided on the insulating layer 350. The connection electrode 325 may make contact with the second electrode 320. For example, the connection electrode 325 may make contact with the second electrode 320 through the hole H, so that the unit electrodes of the second electrode 320 separated from each other may be connected with each other.

The connection electrode 325 may connect second electrodes 320 with each other in a direction different from that of the first electrode 310. In detail, the second electrode 320 may extend in a direction different from that of the first electrode 310 through the connection electrode 325.

Accordingly, the first electrode 310 and the second electrode 320 may be provided on the same surface of the substrate 200 without the contact with each other on the substrate 200.

Referring to FIG. 17, the insulating layer 350 may be provided on the first electrode 310. In detail, the insulating layer 350 may surround the first electrode 310.

The connection electrode 325 may be provided on the insulating layer 350. The connection electrode 325 may make contact with the second electrode 320. For example, the connection electrode 325 is bent toward the second electrode 320 on the insulating layer 350 to make contact with the second electrode 320. Accordingly, the unit electrodes of the second electrode 320 separated from each other may be connected with each other.

The connection electrode 325 may have a bent surface of a bending part 325c. In addition, the thickness T3 of the connection electrode 325 may be equal to or thicker than at least one of the thickness T1 of the first electrode 310 and the thickness T2 of the second electrode 320.

The connection electrode 325 may connect second electrodes 320 with each other in a direction different from that of the first electrode 310. In detail, the second electrode 320 may extend in a direction different from that of the first electrode 310 through the connection electrode 325.

Accordingly, the first electrode 310 and the second electrode 320 may be provided on the same surface of the substrate 200 without the contact with each other on the substrate 200.

Figure 18:
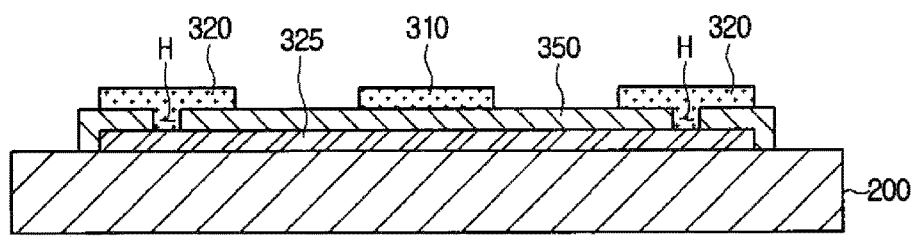
Figure 19:
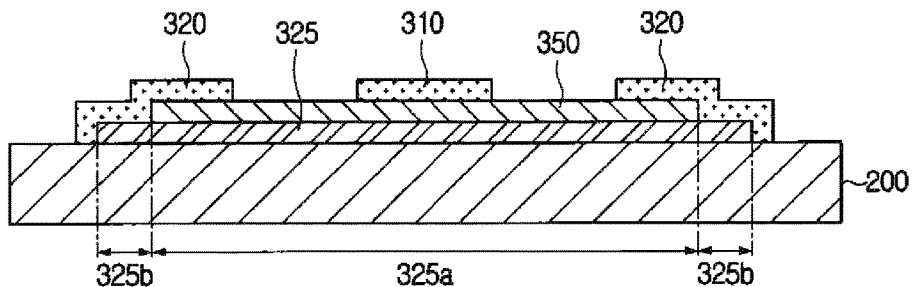

Referring to FIGS. 18 and 19, the first electrode 310 and the second electrode 320 may not directly make contact with the substrate 100 in the third area 3A. For example, the first electrode 310 and the second electrode 320 may not make contact with the substrate 200 on the same surface of the third area 3A of the substrate 200.

In detail, the connection electrode 325 may be provided on the third area 3A of the substrate 200. The connection electrode 325 may directly make contact with the substrate 200.

The insulating layer 350 may be provided on the connection electrode 325. In detail, the insulating layer 350 may surround the connection electrode 325 or may be partially provided on the connection electrode 325.

Referring to FIG. 18, the insulating layer 350 may surround the connection electrode 325. In addition, the insulating layer 350 may be formed therein with a hole H. In detail, the insulating layer 350 may be provided on the connection electrode 325, and the connection electrode 325 may be exposed through the hole H.

The first electrode 310 and the second electrode 320 may be provided on the insulating layer 350. In detail, the first electrode 310 and the second electrode 320 may be spaced apart from each other on the third area 3A of the substrate 200. The first electrode 310 may extend in the first direction, and the second electrode 320 may be divided into unit electrodes.

The first electrode 310 and the connection electrode 325 may extend in mutually different directions. For example, the first electrode 310 may extend in the first direction, and the second connection electrode 325 may extend in the second direction.

The second electrode 320 may make contact with the connection electrode 325 through the hole H. Accordingly, the unit electrodes of the second electrode 320 separated from each other may be connected with each other.

The second electrode 320 may extend in a direction different from the first electrode 310 through the connection electrode 325.

Accordingly, the first electrode 310 and the second electrode 320 may be provided on the same surface of the substrate 200 without the contact with each other on the substrate 200.

In addition, referring to FIG. 19, the insulating layer 350 may be partially provided on the connection electrode 325. For example, the insulating layer 350 is partially provided on the connection electrode 325 to expose both ends of the connection electrode.

Accordingly, the connection electrode 325 may include a non-exposed area 325a covered by the insulating layer 350 and an exposed area 325b which is not covered by the insulating layer 350.

The first and second electrodes 310 and 320 may be provided on the insulating layer 350. In detail, the first and second electrodes 310 and 320 may be separated from each other on the third area 3A of the substrate 200. The first electrode 310 may extend in a first direction, and the second electrode 320 may be divided into unit electrodes.

The first electrode 310 and the connection electrode 230 may extend in mutually different directions. For example, the first electrode 310 may extend in the first direction, and the connection electrode 230 may extend in the second direction.

The second electrode 320 may make contact with the connection electrode 325 through the exposed area 325b. Accordingly, the unit electrodes of the second electrode 320 separated from each, other, may be connected with each other.

The second electrode 320 may extend in a direction different from that of the first electrode 310, that, is, the second direction through the connection electrode 325.

Accordingly, the first electrode 310 and the second electrode 320 may be provided on the same surface of the substrate 200 without the contact with each other on the substrate 200.

The chip 600 may be provided in the fourth area 4A of the substrate 200. For example, the chip 600 may be a fingerprint recognition driving chip. The chip 600 may be connected with the first electrode 310 and the second electrode 320. In detail, the chip 600 may be connected with the first electrode 310 extending in the first area 1A and the second electrode 320 extending in the second area 2A.

In addition, the chip 600 may be connected with an external main board driving chip. Accordingly, when a fingerprint is touched onto the fingerprint sensor, the fingerprint can be recognized by the chip and the external main board driving chip for the driving of the fingerprint sensor.

Figure 20:
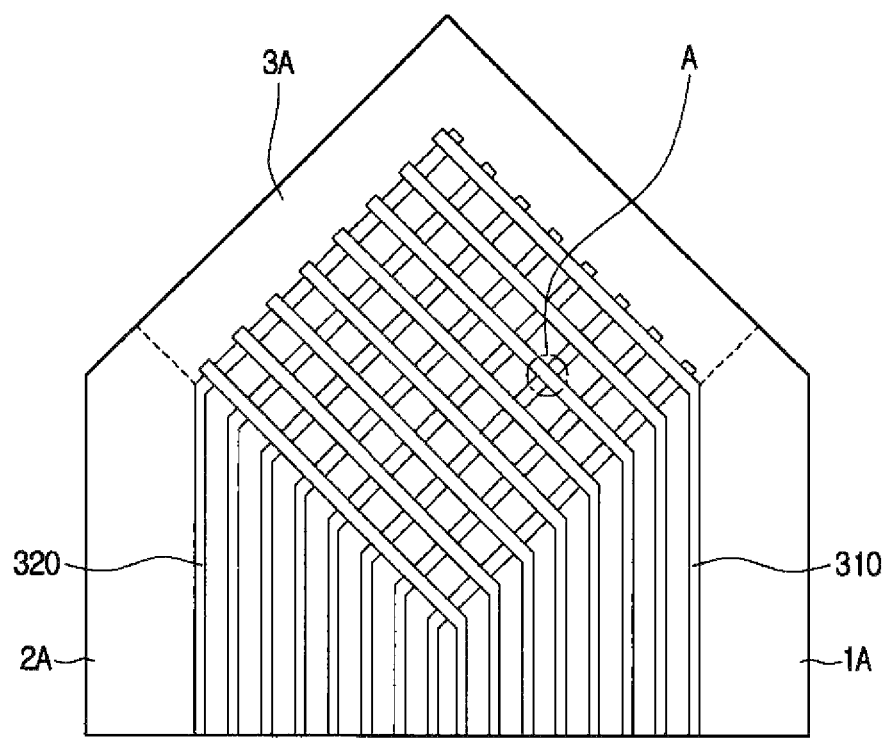
FIGS. 20 and 21 are plan views showing the fingerprint sensor according to the second embodiment which is folded in a direction of D-D'.
Figure 21:
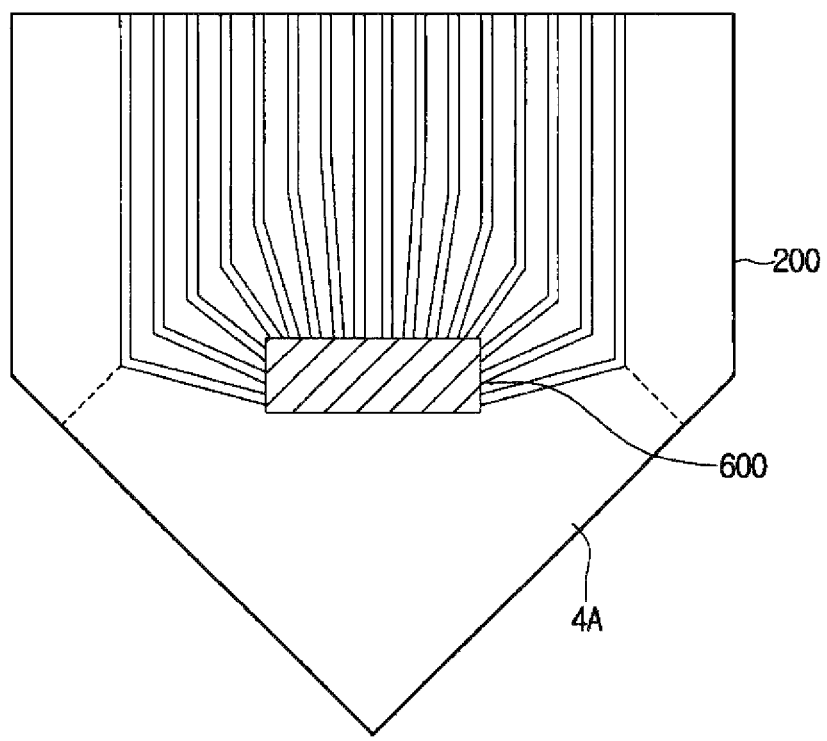

Referring to FIGS. 20 and 21, the substrate 200 may be folded. In detail, the substrate 200 is folded at the first and second areas 1A and 2A, so that the third area 3A and the fourth area 4A are combined with each other.

As the substrate 200 is folded, the first electrode 310 and the second electrode 320 of the third area 3A may be provided on one surface of the substrate 200, and the chip 600 of the fourth area 4A may be provided on an opposite surface of the substrate 200. In addition, the first electrode 310 and the second electrode 320 at the third area 3A may be connected with the chip 600 at the fourth area 4A through the first electrode 310 provided at the first area 1A and the second electrode 320 provided at the second area 2A.

According to the fingerprint sensor of the second embodiment, the electrode and the chip may be provided according to areas on the same surface of the substrate, and the substrate is folded, so that the electrode may be provided on one surface of the substrate, and the chip may be provided on the opposite surface of the substrate.

The substrate may be folded with respect to a virtual line of B-B' of FIG. 1 so that an area in which the first and second electrodes are provided is overlapped with an area in which a chip is provided.

Accordingly, the first and second electrodes may be connected with the chip within the shortest distance.

In the case of the fingerprint sensor, in order to detect the variation on a micro-cap, the distance between a sensing part and a chip must be short. However, as the sensing part becomes gradually away from the chip, the touch sensitivity of the fingerprint sensor may be degraded due to the noise resulting from the distance difference.

Therefore, according to the fingerprint sensor of the second embodiment, the distance difference between the chip and the electrode, that is, the distance difference between the chip and the sensing parts can be reduced to the minimum value. Accordingly, the noise resulting from the distance difference between the chip and the sensing parts can be reduced, so that the touch characteristic and the reliability of the fingerprint sensor can be improved.

Hereinafter, a display device employing the touch window including the fingerprint sensor according to the above-described embodiments will be described with reference to FIGS. 18 to 21.

The fingerprint sensor according to the embodiments may be applied to a locking device. For example, the fingerprint sensor according to the embodiments is applied to an electronic product to be applied to a locking device.

Figure 22:
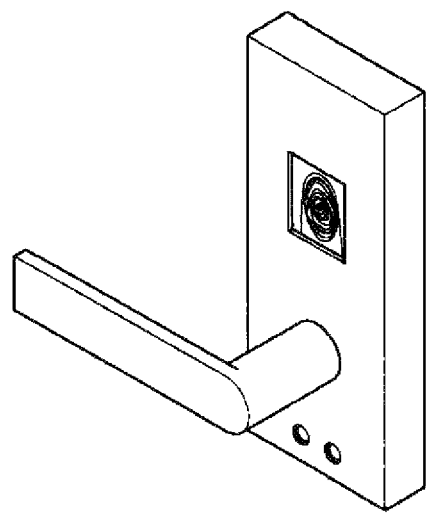
FIGS. 22 to 25 are views showing one example of a touch device employing the fingerprint sensor according to the embodiment.
Figure 23:
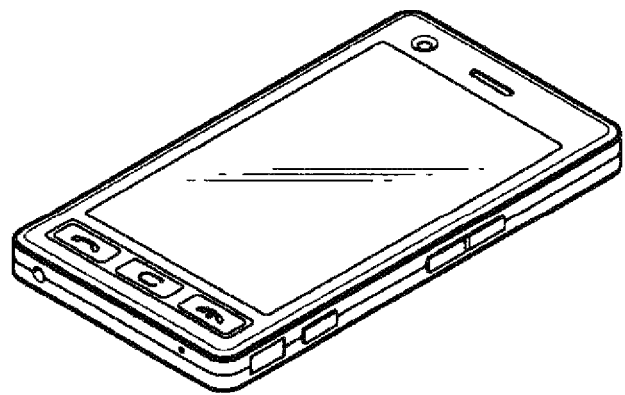

For example, as shown in FIG. 22, the fingerprint sensor according to the embodiments is coupled to the door lock to serve as a locking device of the door lock. In addition, as shown in FIG. 23, the fingerprint sensor is coupled to a cellular phone and thus applied to the locking device of the cellular phone.

In addition, the fingerprint sensor according to the embodiments may be applied to a power device. For example, the fingerprint sensor according to the embodiments may be applied to a household electronic device and a vehicle.

Figure 24:
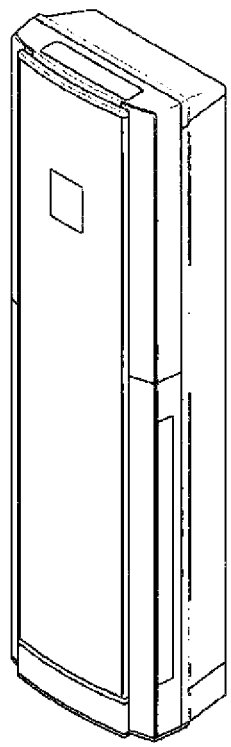
Figure 25:

In detail, as shown in FIG. 24, the fingerprint sensor is coupled to a household electronic device such as an air conditioner to serve as a power device. In addition, as shown in FIG. 25, the fingerprint sensor may be applied to a vehicle so that the fingerprint sensor may be applied to a power device of a starting device and a car audio system of the vehicle.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it, is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fingerprint sensor comprising:
   a substrate comprising a first area to a fourth area;
   a first electrode on the first area and third area;
   a second electrode on the second area and third area; and
   a chip connected with the first and second electrodes, and the chip is on the fourth area,
   wherein the first sensing electrode, the second sensing electrode and the chip are provided on a same surface of the substrate,
   wherein the substrate is folded at the first and the second area so that the third area faces either in an up or in a down direction and the fourth area faces in an opposite direction,
   wherein the first electrode is overlapped with the second electrode on the third area, and an insulating layer is disposed between the first electrode and the second electrode,
   wherein after folding said same surface of the substrate now includes a first surface facing in the up direction and a second surface facing in the down direction,
   wherein the first surface and the second surface are divided by a folded portion of the substrate, and
   wherein the first and second electrodes on the third area are on the first surface of the substrate and the chip is on the second surface of the substrate, wherein either the chip is positioned below the first and second electrodes or the first and second electrodes are positioned below the chip.

2. The fingerprint sensor of claim 1, wherein the first electrode and the second electrode extend in mutually different directions in the third area.

3. The fingerprint sensor of claim 1, wherein the first and second electrodes make contact with the substrate.

4. The fingerprint sensor of claim 3, wherein the third area is provided therein with the first and second electrodes on the substrate, an insulating layer provided on the first and second electrode to expose the second electrode, and a connection electrode making contact with the second electrode on the insulating layer.

5. The fingerprint sensor of claim 4, wherein the insulating layer is partially provided on the second electrode.

6. The fingerprint sensor of claim 4, wherein the insulating layer surrounds the first and second electrodes, and is formed therein with a through hole to expose the second electrode.

7. The fingerprint sensor of claim 3, wherein the third area is provided therein with the first and second electrodes on the substrate, an insulating layer to surround the first electrode, and a connection electrode making contact with the second electrode on the insulating layer.

8. The fingerprint sensor of claim 7, wherein the insulating layer makes contact with only the first electrode, and the connection electrode is bent on the insulating layer to make contact with the second electrode.

9. The fingerprint sensor of claim 1, wherein the third area is provided therein with a connection electrode on the substrate, an insulating layer provided on the connection electrode while forming an exposed surface of the connection electrode, a first electrode on the connection electrode, and a second electrode making contact with the connection electrode through the exposed surface on the connection electrode.

10. The fingerprint sensor of claim 1, wherein the insulating layer is a piezoelectric layer.

11. The fingerprint sensor of claim 10, wherein the insulating layer includes a PVDF.

12. The fingerprint sensor of claim 1, wherein the first to fourth areas is integrally formed with each other while being connected with each other.

13. The fingerprint sensor of claim 1, wherein the chip is a fingerprint recognition driving chip and the chip is connected with an external main board driving chip.

14. The fingerprint sensor of claim 1, wherein the first electrode is bent at the intersection of the first area and the third area, and the second electrode is bent at the intersection of the second area and the third area.

15. The fingerprint sensor of claim 1, wherein the first electrode is bent at the intersection of the first area and the fourth area, and the second electrode is bent at the intersection of the second area and the fourth area.

16. A touch device comprising the fingerprint sensor according to claim 1.

* * * * *